United States Patent [19]

Borburgh

[11] Patent Number: 4,458,533
[45] Date of Patent: Jul. 10, 1984

[54] APPARATUS FOR ULTRASONIC SCANNING

[75] Inventor: Jacques Borburgh, Poxdorf, Fed. Rep. of Germany

[73] Assignee: Siemens Aktiengesellschaft, Berlin & Munich, Fed. Rep. of Germany

[21] Appl. No.: 265,781

[22] Filed: May 21, 1981

[30] Foreign Application Priority Data

Jun. 2, 1980 [DE] Fed. Rep. of Germany ....... 3020872

[51] Int. Cl.$^3$ .......................................... G01N 29/00
[52] U.S. Cl. ...................................... 73/625; 73/602; 73/628; 73/641; 73/626; 367/105; 128/660
[58] Field of Search ................. 73/602, 625, 626, 628, 73/633, 641; 367/105, 61; 128/660

[56] References Cited

U.S. PATENT DOCUMENTS

| | | | |
|---|---|---|---|
| 4,161,122 | 7/1979 | Buchner | 73/626 |
| 4,228,686 | 10/1980 | Tancrell | 73/626 |
| 4,254,662 | 3/1981 | Kuroda et al. | 73/626 |
| 4,259,733 | 3/1981 | Taner et al. | 367/61 |
| 4,287,580 | 9/1981 | Holzschuch | 367/105 |
| 4,325,257 | 4/1982 | Kino et al. | 73/626 |
| 4,330,875 | 5/1982 | Tachita et al. | 73/626 |

FOREIGN PATENT DOCUMENTS 41664 5/1981 European Pat. Off. ............. 73/625

OTHER PUBLICATIONS

Davies et al., "Low Sidelobe Patterns from Thinned Arrays Using Multiplicative Processing"; *IEE Proceedings*, vol. 127, Part F, No. 1, Feb. 1980, pp. 9-15.
*Ultrasonics Symposium Proceedings*, IEEE Cat. 77CH1264-ISU, 1977, pp. 250 through 254, McKeighen et al., "New Techniques for Dynamically Variable Electronic Delays for Real Time Ultrasonic Imaging".

*Primary Examiner*—Howard A. Birmiel
*Attorney, Agent, or Firm*—Hill, Van Santen, Steadman & Simpson

[57] ABSTRACT

In an exemplary embodiment, a transducer element row $W_1$ through $W_m$ has a signal delay device for the delay of arriving echo signals in such a manner that phase balance of the individual signals result at the output. It is the objective of the disclosure to construct such an apparatus with which, given a specified number of transducers, the grating lobes in the directional response of the antenna are eliminated, and nevertheless the electronic outlay can be kept within boundaries. This objective is achieved in that the signals are transmitted, in groups, respectively, by the delay device to individual adders whose output signals are linked in a unit for quasi-multiplicative processing. In the case of digital technique, through binary signal processing, a considerable simplification results accompanied by the elimination of the interfering directional response of the resolution capability.

5 Claims, 8 Drawing Figures

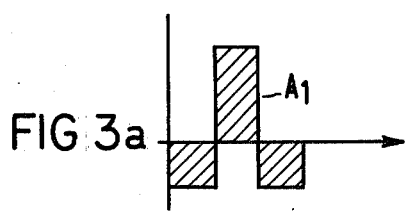
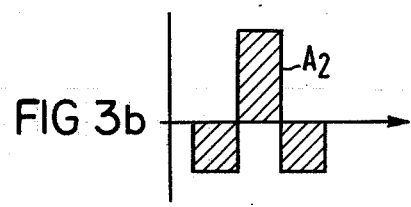
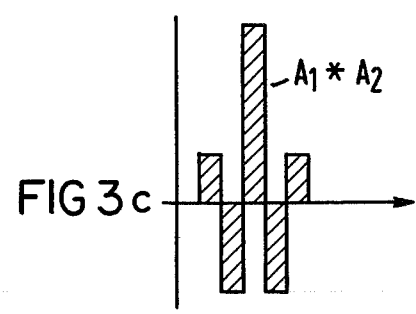
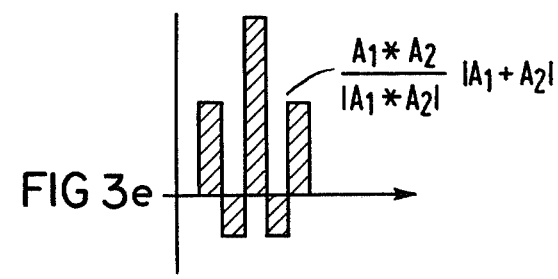
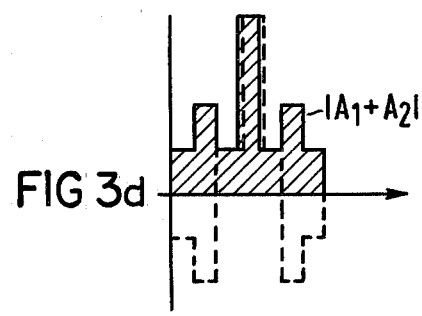
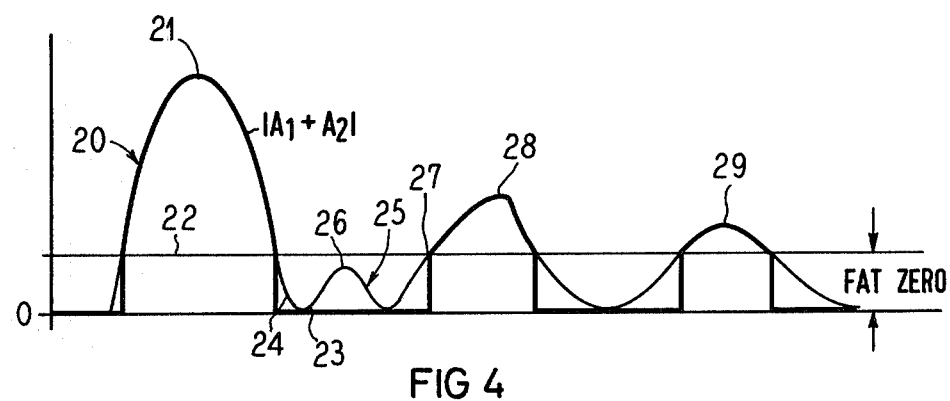

APPARATUS FOR ULTRASONIC SCANNING

BACKGROUND OF THE INVENTION

The invention relates to an apparatus for ultrasonic scanning comprising an ultrasonic applicator which, by means of a plurality of individual transducer elements, is designed for the transmission of ultrasonic signals and for the reception of the echo signals, and wherein at least in the electric receiving circuit, a delay device chronologically delays the incoming echo signals for each transducer element such that there results, in the chronological sequence of the arrival of signals at the individual elements, phase balance of the individual signals at the summation circuit connected with the output of the delay device.

An apparatus of this type is, for example, described in an article in "Ultrasonics Symposium Proceedings", IEEE CAT. 1977, at pages 250 to 254. This apparatus operates in analog or digital technique with storage members as a delay network, wherein a common summing amplifier is activated by the storage members. In addition, it has already been proposed in German patent application No. P 29 42 049.3 (U.S. Ser. No. 191,779 filed Sept. 29, 1980, now U.S. Pat. No. 4,373,395 issued Feb. 15, 1983) to sequentially digitally store ultrasonic signals arriving at the individual transducers, whereby, in particular, the possibility of an optimized signal processing results.

In the case of apparatus of the type initially cited, a number m of individual transducer elements each of a width b form an array of the overall width B. As a whole, such a transducer array can be employed, for example, for phase-controlled array systems in the case of ultrasonic apparatus with sector scanning by means of an electronic beam pivoting, whereby additionally also a dynamic focusing is possible. In addition to this, the utilization in the case of a linear array without beam pivoting, but with dynamic focusing, is conceivable. In all cases, a good resolution is desired. If the width b of an individual transducer element is greater than the wavelength of the ultrasonic signals emitted by the array, however, as is known, so-called "grating lobes" occur in the directional sensitivity (or response) of the array, which grating lobes considerably impair the lateral resolution. For this reason, one seeks to increase the number of transducer elements in the specified aperture range as far as possible, as a consequence of which the width b of an individual element must be correspondingly reduced. In the case of the phase-controlled array systems, however, the outlay for a controlling electronic system with preamplifiers, delay lines and the like, is thereby increased in an undesired manner, so that other solutions are sought for.

SUMMARY OF THE INVENTION

It is accordingly the object of the invention to construct an apparatus of the type initially cited in which the undesired grating lobes in the directional sensitivity (or response) are eliminated, and in which, nevertheless, the electronic outlay is kept within boundaries.

In accordance with the invention the object is achieved in that the signals are transmitted respectively in groupwise fashion by the delay device to individual adders, whose output signals are linked in a unit for the purpose of quasi-multiplicative signal processing.

Thus, with the invention, the width B of an array, which forms an antenna for the ultrasonic signals, is subdivided into several equal subantennas. Each of these subantennas is constructed from elements having a width b, which can now be greater than the wavelength. With a specified width B of the array, the loss of lateral resolution is thus substantially less.

In the case of an inventive apparatus for ultrasonic scanning, the outlay for control, as a whole, is considerably simplified. Since the result is already output in digital form by the summing circuit, subsequent to addition of the individual signals, the further linkage of the individual signals can be executed in a quasi-multiplicative fashion. The individual echo signals are now only further transmitted in the form of multibit information word and operational sign information.

In a preferred further development of the invention, it is advisable to cut off certain areas from the ultrasonic echo information and to evaluate them uniformly. For this purpose, the LSB-value bit (last or least significant bit) of the multibit information is shifted to higher values, and the entire cut-off section is uniformly evaluated as zero. This method is generally prior-known in digital technique under the term of "FAT ZERO".

Specifically for the representation of ultrasonic signals of an ultrasonic applicator with an array arrangement, the principle of the "FAT ZERO" advantageously provides the possibility of selecting the obtained ultrasonic echo information and to represent it in such a manner that, in the constructed ultrasonic image, the contours are emphasized in a defined fashion.

Further details and advantages of the invention are apparent from the following figure description of an exemplary embodiment on the basis of the accompanying drawing sheets in conjunction with additional subclaims; and other objects, features and advantages will be apparent from this detailed disclosure and from the appended claims.

BRIEF DESCRIPTION OF THE DRAWINGS

FIGS. 3a–e illustrates, on the basis of a diagram, the quasi-multiplicative linkage; and FIG. 4 illustrates the principle of signal fading-out according to the "FAT ZERO" principle.

DETAILED DESCRIPTION

Figure 1:
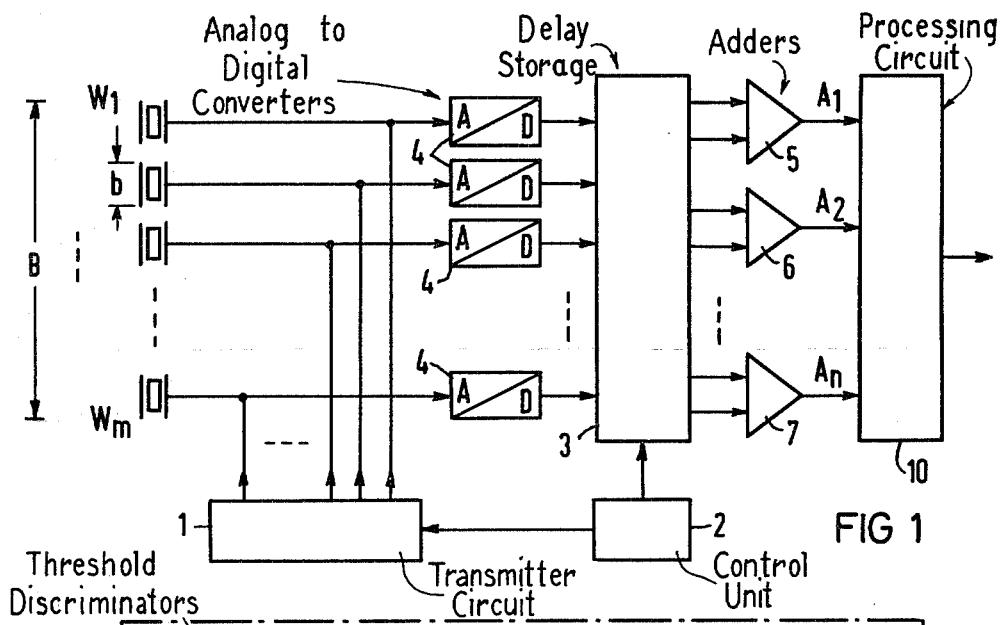
FIG. 1 illustrates a basic circuit diagram of the invention.

In FIG. 1, $W_i$ designates 1 through m ultrasonic transducer elements. The transducer elements $W_i$ have respectively the individual width b, whereby altogether an overall width B of the ultrasonic antenna results. The transducers $W_i$ are activated by a transmitter 1 in a phase-delayed fashion, for which purpose the transmitter 1 is capable of being activated by a control unit 2 according to a program.

The ultrasonic signals, received time-delayed from the individual transducers $W_i$ due to the transit time differences, are transmitted via individual lines to a delay storage 3 which is controlled by the control unit 2 in dependence upon the transmitting program. Connected before the delay storage are respectively identical analog to digital converters 4, so that the ultrasonic echo signals at the delay storage are already present in digital form. The delay device 3 can then be correspondingly laid out with digital memories, whereby the possibility of a minimized memory outlay already results due to suitable memory organization and provision of partial line memories. A delay and signal processing installation of this type is specifically described in the aforementioned German patent application No. P 29 42 049.3 to which reference is here made.

The outputs of the individual units of the delay device 3—differing from the above-mentioned German patent application—are connected in groups to separate digital adders. In FIG. 1, it is indicated that the lines of respectively two transducers $W_i$ are connected in groupwise fashion to the respective adders 5 through 7. Thus, correspondingly, several subantennas are formed by the total ultrasonic antenna with individual transducers $W_i$. The signals $A_i$ for $i=1$ through n are respectively emitted by the digital adders 5 through 7, which signals respectively separately activate a unit for the quasi-multiplicative processing of the signals. This unit is illustrated in FIG. 1 by 10 in the form of a block and shall be described in detail on the basis of FIG. 2.

Figure 2:
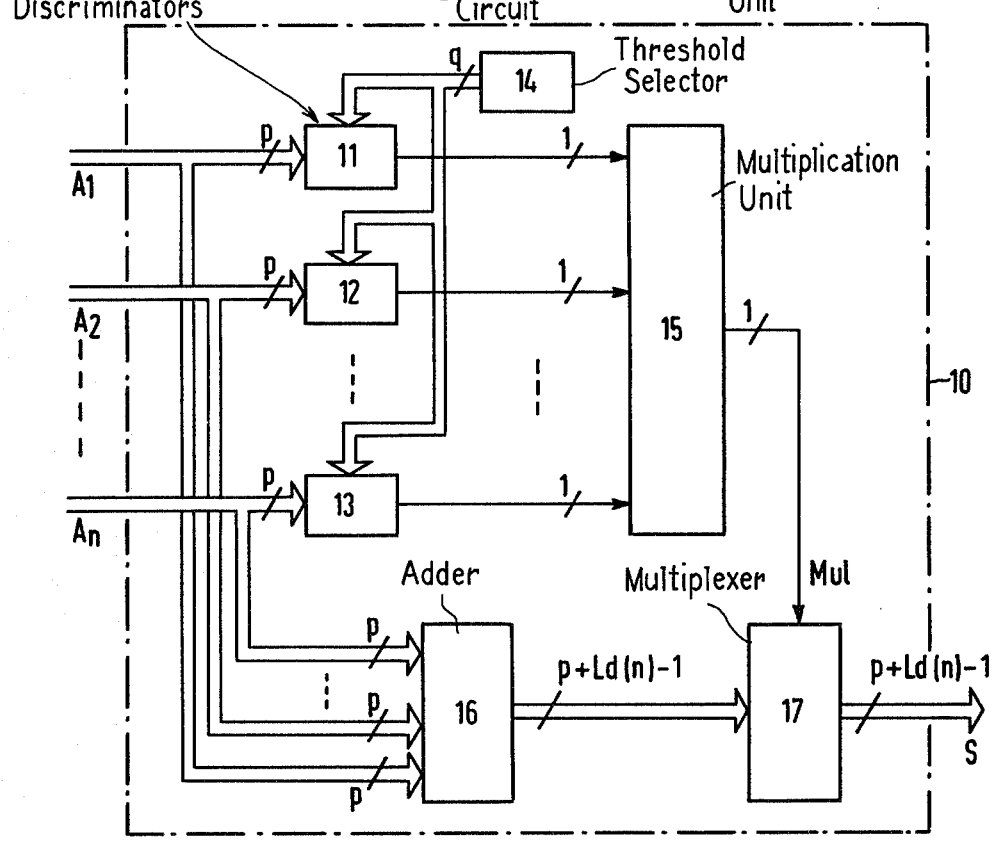
FIG. 2 illustrates the multiplicative linkage unit in the form of a block circuit diagram.

After digitizing and adding-up the individual signals, the output signals $A_i$ for $i=1$ through n are each in the form of a multibit information word with p-bits, for example, nine bits. The multibit information word from each of the adders such as 5 through 7 is illustrated in FIG. 2 as being supplied via a data bus to a respective one of the inputs of the unit 10. Each data bus activates a threshold discriminator such as 11 through 13 in which the signal is rectified and compared with an adjustable value with q bits. For this purpose, the comparators 11 through 13, for the adjustment of a comparison value, are activated by the data bus of an adjustment unit 14 which puts out a selected q bit-information word. The specific utilization of the adjustment unit 14 shall be explained in detail further below.

Through comparison of the input information with specifiable values, there is generated, by the threshold value comparators 11 through 13, an output signal with one bit which is either zero or one. These signals are logic linked in a multiplication unit 15 which, in turn, delivers an output signal with one bit.

The data bus for each of the signals $A_i$ for $i=1$ through n is connected, parallel to the threshold value comparators 11 through 13, to a summation circuit 16. In this summation element the absolute value of the signals $A_i$ for $i=1$ through n is formed with p bits respectively. The output signal of the summation circuit 16, accordingly, is a signal with $p+Ld(n)-1$ bit (Ld is defined as logarithm to the base 2). This information, together with the one-bit signal Mul of the multiplier 15, is transmitted to a multiplexer 17 from which an output signal S, again with $p+Ld(n)-1$ bit is output. The signal S has either the value zero, if the input Mul has a value of zero, or it has the result of the adder 16 when the input Mul has a value of one. The signal S can subsequently be utilized for the purpose of image display on an oscilloscope or the like.

In the unit for the quasi-multiplicative processing 10, thus a signal linkage is carried out which can be represented for two individual signals $A_1$ and $A_2$ by the following equation.

$$(A_1 * A_2)_{quasi} = \frac{A_1 * A_2}{|A_1 * A_2|} \cdot |A_1 + A_2| \quad (1)$$

with $A_1 \smile A_2 \neq 0$; generalized for $A_i$ the following applies:

$$\stackrel{quasi}{\pi} A_i = \frac{\pi A_i}{|\pi A_i|} \cdot |\Sigma A_i|, \; i = 1 \text{ through } n \quad (2)$$

In FIG. 3, the quasi-multiplicative signal linkage is illustrated in detail on the basis of the diagrams of FIGS. 3a–3e. FIG. 3a represents the signal $A_1$ and FIG. 3b represents the signal $A_2$. In FIG. 3c, the two signals $A_1$ and $A_2$ are logic linked through mathematical multiplication of the unit forms. FIG. 3d illustrates in dash lines the summation of the signals $A_1$, $A_2$, as well as indicating in heavy solid lines the absolute value of the sum $|A_1+A_2|$.

FIG. 3d (the heavy solid line curve) can now be transferred into FIG. 3c if the signal $|A_1+A_2|$ is evaluated with an operational sign factor. The signal according to FIG. 3e then results through quasi-multiplicative linkage (or operation).

The comparison of the diagrams of FIGS. 3c and 3e shows that except for the amplitudes, the same results have been obtained. Since the digital signal is further transmitted through the binary information, the amplitude is of no decisive significance. In the case of the described signal processing, what is finally obtained is a signal plus, zero or minus. From the diagrams of FIGS. 3c and 3e one recognizes, respectively, that the frequency of the signal sequence has doubled. This frequency increase effects a corresponding increase of the resolution.

In the simplest embodiment the threshold value comparators 11 through 13 for the binary signals can be formed by gates, for example OR gates, which exhibit signal inputs corresponding to the bit number. The possibility now results of being able to fade (or block) out a portion of the binary information. In a practical realization for this purpose, the LSB-value bits (LSB=least or last significant bit) are not supplied to the inputs of the OR gates forming the comparators 11 through 13. In the extended sense, this means that the threshold value comparators are adjustable in height with the use of the threshold value.

In the digital technique, specifically this principle of the shift of the LSB-value bit to higher values is known as "FAT ZERO". Thus, the entire range below the threshold value is valued as "expanded" zero, and only the signal information above the "FAT ZERO" value is correspondingly further processed.

In FIG. 4, a diagram of such an example is illustrated. A signal $|\Sigma A_i|$ is here already rectified and added in accordance with FIG. 3d, whereby, through the threshold, only the signal represented by the heavy line is present for further processing. In this manner, in particular, noise signals, and the like, can be well suppressed. Through expansion, or narrowing, respectively, of the "FAT ZERO" range, the signal information can thus be further processed in a defined manner.

Specifically in the case of ultrasonic signal processing, through this principle, the possibility now arises of suppressing the structure of the ultrasonic image built-up on a monitor and to emphasize the contours in the image in a defined manner.

Altogether, through the division of the ultrasonic antenna into several subantennas, a significant improvement of the direction characteristic in the resolution capability results. The lateral resolution is improved; through the above-described quasi-multiplicative signal processing, also the overall electronic outlay is kept within justifiable boundaries. If a specific number of transducers $W_i$ is specified, then, for the individual instance, the group allotment can be matched to the requirements; e.g., in the case of eight transducer elements, four groups with two elements or two groups with four elements.

It will be apparent that many modifications and variations may be effected without departing from the scope of the novel concepts and teachings of the present invention.

SUPPLEMENTAL DISCUSSION

As represented in FIG. 4, where there are two adders present such as 5 and 6 and two threshold discriminators such as 11 and 12, (i.e. n=2), the processing unit 10 would supply at the output of multiplexer 17, an output signal S having a value of either $|A_1+A_2|$ or zero. In a first set of outputs $A_1$ and $A_2$ from delay storage 3, (corresponding to a first sampling by converters 4) the digital signal $A_1$ may have a negative value and the digital signal $A_2$ may have a value zero. Where the threshold for the discriminators is set at a plus one value, threshold discriminator 11 would provide a binary output representing a binary zero (the negative value of $A_1$ being below the threshold), and discriminator 12 would also supply a binary zero (the value zero of signal $A_2$ being less than the threshold value). Where negative binary numbers are represented by a one in the ninth bit position and positive binary numbers are represented by a zero in the ninth bit position, (for p=9), and where the threshold is set to a value of plus one, the ninth bit may be supplied via an inverter to an output AND gate of each discriminator, so that the discriminators would supply a binary zero output (from the output AND gate) for any negative value of $A_i$.

Each discriminator may comprise an OR circuit with eight inputs for the first eight bit positions of the input $A_i$, the sign bit being connected, along with the output of the OR circuit to the respective inputs of the associated output AND gate. For the previously mentioned FAT ZERO type processing, a selected number of bit positions of low order of the signals $A_i$ from each adder 5, 6, etc. may be grounded to provide constant logical zero inputs to the corresponding inputs of the associated OR circuit of the respective discriminator. Thus, for example, only the highest five bit positions (with weights of 8, 16, 32, 64 and 128) of each signal $A_i$ would be transmitted to the respective OR circuit inputs. A logical one in any of the fourth through eight bit positions of a signal $A_i$ would cause the supply of a logical one signal to the associated input of the output AND gate.

If one of the signals $A_1$ and $A_2$ is less than the threshold value, the output of the associated discriminator 11, or 12 will be a logical zero, and the output of the multiplication unit 15 will also be a logical zero. Further, the output S from the multiplexer 17 will be a logical zero signal regardless of the output of adder 16.

Thus, referring to the example where the first sample of signal $A_2$ is zero and the corresponding sample of signal $A_1$ is negative, the threshold value being plus one, the outputs of discriminators 11 and 12 would both be zero, the output of multiplication unit 15 would be a logical zero signal, and the output S of multiplexer 17 would be logical zero.

Referring to FIG. 4, point 21 on curve 20 may represent a sample interval wherein signals $A_1$ and $A_2$ both exceed a threshold value as represented at 22, the sum of the signals $A_1$ and $A_2$ as determined by adder 16 having a maximum value. At a subsequent sample interval as indicated at 23 in FIG. 4 on curve 20, both signals $A_1$ and $A_2$ may be of zero value. At a point 24 on curve 25, signals $A_1$ and $A_2$ may both be of positive polarity, but have a sum less than the threshold value 22, so that the outputs of both discriminators 11 and 12 would be zero and the output of multiplication unit 15 would be zero, the signal S having a zero value at this time point as represented by curve 20 (the heavy line curve). At a sampling time interval such as indicated at 26 on curve 25, both signals $A_1$ and $A_2$ may have negative polarity, and thus have values less than the positive threshold value represented by line 22 in FIG. 4, so that curve 20 would have a value zero at this time point, and the output signal S from multiplexer 17 would be zero. At a subsequent time point as represented by point 27 in FIG. 4, the values of signals $A_1$ and $A_2$ would both be equal to the threshold value settings for discriminators 11 and 12. Thus the outputs of discriminators 11 and 12 would each be a logical one, and the output of multiplication unit 15 would be a logical one, giving rise to an output signal S corresponding to the output of adder 16, namely the sum of signals $A_1$ and $A_2$.

It will be seen from FIG. 4, that if the threshold level 22 is raised by raising the individual thresholds of discriminators 11 and 12, the peak values such as 21, 28, and 29 will have more steeply rising flanks, and the corresponding contours in the image of output signal S will be emphasized.

If it is desired to facilitate manual changing of the threshold value by means of selector 14, then the respective positions of each signal $A_i$ may be supplied to one input of respective input AND gates, whose outputs are connected to the respective inputs of the OR circuit previously mentioned. The second inputs of the respective input AND gates may then be under the control of corresponding bit positions of the selector 14. Thus, if the first three bit positions from selector 14 were placed at a logical zero level, this would eliminate the first three bit positions of the input signal $A_i$ and supply logical zero signals to the corresponding inputs of the OR circuit. The remaining outputs of the threshold selector 14 would be at a logical one level, so that the further bit positions (e.g. the fourth through eighth bit positions) of the signal $A_i$ would be transmitted to the OR circuit. If the threshold were to be set at a negative value, then a separate circuit within each of the discriminators could be activated by the selector 14, all signals $A_i$ with a positive sign bit being transmitted as a logical one output from the discriminator (e.g. by means of an inverter receiving a logical zero representing positive polarity at the ninth bit position and responding thereto to transmit a logical one to an output OR gate also receiving the output of the negative threshold OR circuit), and so on.

As indicated in the copending application Borburgh and Feigt U.S. Ser. No. 49,898 filed Jun. 19, 1979, now U.S. Pat. No. 4,305,014 issued Dec. 8, 1981, it is advantageous to form individual transducer elements such as $W_1$ through $W_m$, FIG. 1 of the present application, with a width (b) smaller than one-fourth the ultrasonic wavelength. According to the present disclosure, such transducer elements which are finely divided so as to have a width less than one-fourth the ultrasonic wavelength, may be individually pulsed to effect ultrasonic transmission. For example, for the case of an ultrasonic array having 512 individual transducer elements, successive offset groups of elements may be sequentially pulsed to define successive scanning lines in a plane. This type of ultrasonic scanning is illustrated, for example, in Hassler U.S. Pat. No. 4,235,111.

Similarly, for the case of compound scanning, selected groups of transducer elements may receive the ultrasonic transmission pulse with varying time delays for the purpose of steering the ultrasonic beam, and thus to effect a sector type sweep of the beam within a plane.

Thus, according to the teachings of the present disclosure, during transmission, groups of elements may be simultaneously energized under the control of programmable electronic circuitry. For example, in the case of a scanning control shift register as shown in Hassler U.S. Pat. No. 4,235,111, successive pairs of adjacent transducer elements may always be energized simultaneously, for example by utilizing a number of shift register positions corresponding to the number of pairs, and providing that the output at each shift register position drive a pair of electronic switches so that the ultrasonic pulse is supplied via the respective switches to the respective transducer elements of a given pair. As another example, the scan control shift register may have a number of stages corresponding to the number of transducer elements; in this case, logical ones may be loaded into the first two stages of the shift register for controlling transmission of a first ultrasonic pulse by a first pair of transducer elements, after which the pair of ones in the shift register may be double shifted, so as to enable activation of the transducer elements of a second pair, and so on.

With such programmable selection of transducer element groups during transmission, the present disclosure teaches that a selected group of finely divided transducer elements, for example successive pairs of finely divided transducer elements, may be permanently electrically associated with a given adder. Thus referring to FIG. 1 of the present application, transducer elements $W_1$ and $W_2$ (having a total width of approximately one-half the ultrasonic wavelength) may be connected via respective analog to digital converters and via the delay storage 3, to a common adder such as 5. In this case, the transducer elements $W_1$ and $W_2$, for example, effectively provide only a single digital signal $A_1$ for processing by the processing circuit 10, and such joint operation of the transducer element pairs may be a permanent feature of the functioning of the equipment once it is placed in service. By permanently processing the output $A_i$ from respective groups of transducer elements, circuit complexity is materially reduced, while achieving the advantages as described in detail in the aforesaid application Ser. No. 049,898 with respect to optimum ultrasonic receiving efficiency for compound scan, linear array scan, and phased array sector scan, with improved lateral resolution.

In accordance with the teachings of the present application, significant advantages are achieved where the individual transducer elements have a width of about one-half the ultrasonic wavelength, and then are combined into operationally permanent groups (or "subantennas"). Thus for example, individual transducers with a width each of one-half the ultrasonic wavelength may be permanently combined into groups each with two transducer elements, or into groups each with four transducer elements, the individual transducer elements being individually activated, for example with individual time delays, to effect a sector type scanning sweep during ultrasonic transmission operations, but the respective groups (or subantennas) being permanently operatively connected together for simultaneous processing in accordance with the teachings of FIG. 1 of the present application. Thus, where the individual transducer elements $W_i$ each have a width (b) of one-half the ultrasonic wavelength, each successive pair (such as $W_1$ and $W_2$) of the transducer elements may be permanently coupled with respective inputs of a common digital adder (such as 5, FIG. 1). Alternatively, groups of four transducer elements each with a width (b) of one-half the ultrasonic wavelength may be permanently operationally coupled to four respective inputs of a common adder, such that all four transducer elements always produce an ultimate output signal ($A_i$) for processing by the processing circuit 10.

Where finely divided individual transducer elements, for example individual transducer elements with a width of about one-fourth the ultrasonic wavelength and substantially less than the transducer element height are combined into groups, the total width of the group of transducer elements can be greater than one-half the ultrasonic wavelength, and can be greater than one ultrasonic wavelength, so long as the height of each individual transducer element of the group is at least about twice the width of such individual transducer element. Where the individual transducer elements are about one-fourth the ultrasonic wavelength, they are so thin that for example four, eight or even more transducer elements may be permanently operationally interconnected with respect to the processing circuitry 10 of FIG. 1 of the present application. It is found that the total width of a group of finely divided individual transducer elements may even be considerably greater than the width of a corresponding individual conventional transducer element so long as the width of the individual finely divided transducer element is small in comparison to the height (i.e. less than one-half the height) of such individual finely divided transducer element.

I claim as my invention:

1. Apparatus for ultrasonic scanning, comprising an ultrasonic applicator having a plurality of individual transducer elements operable for the transmission of ultrasonic signals and for the reception of the echo signals, an electric receiving circuit including a delay device having an output, and operable to chronologically delay the arriving echo signals for each transducer element in such a manner that there results, in the chronological sequence of the arrival of signals at the individual elements, phase balance of the individual signals at the output, individual adders receiving signals in respective groups from the output of the delay device and operative to provide respective output signals, and a signal processing circuit coupled with the adders for effecting a quasi-multiplicative signal processing of the output signals, characterized in that the individual adders are digital adders supplying binary coded output signals, said signal processing circuit effecting a quasi-multiplicative combination of the binary coaded/output signals with the product of the output signals being divided by the absolute value of the product of the output signals and this quotient being multiplied by the absolute value of the sum of the output signals.

2. Apparatus according to claim 1, with the receiving circuit including analog to digital converters for digitizing the echo signals and supplying digitized echo signals to said delay device.

3. Apparatus according to claim 1, characterized in that the signal processing circuit comprises a threshold value comparator for operating on each output signal, a multiplier for the formation of an operation signal, a common summation circuit for the formation of the absolute sum of the output signals of the adders, and a multiplexer for logically operating on the absolute sum in accordance with said operation signal.

4. Apparatus according to claim 3, with an adjustment unit for selecting a threshold value for the comparators, the threshold values of the comparators being adjustable by means of the adjustment unit.

5. Apparatus according to claim 3, characterized in that the comparators are formed by means of OR gates.

* * * * *